(12) United States Patent
Beyfuss et al.

(10) Patent No.: US 11,852,196 B2
(45) Date of Patent: Dec. 26, 2023

(54) CAGE SEGMENT FOR A ROLLING-ELEMENT BEARING CAGE

(71) Applicant: AKTIEBOLAGET SKF, Gothenburg (SE)

(72) Inventors: Berthold Beyfuss, Wasserlosen-Kaisten (DE); Hans-Juergen Friedrich, Königsberg-Römershofen (DE); Alfred Radina, Poppenlauer (DE); Maximilian Soellner, Bundorf (DE); Jonas Schierling, Hassfurt (DE)

(73) Assignee: AKTIEBOLAGET SKF, Gothenburg (SE)

( * ) Notice: Subject to any disclaimer, the term of this patent is extended or adjusted under 35 U.S.C. 154(b) by 0 days.

(21) Appl. No.: 17/835,086

(22) Filed: Jun. 8, 2022

(65) Prior Publication Data

US 2022/0403885 A1    Dec. 22, 2022

(30) Foreign Application Priority Data

Jun. 18, 2021    (DE) .......................... 102021206282.2

(51) Int. Cl.
*F16C 33/50*    (2006.01)
*F16C 33/46*    (2006.01)
*F16C 33/54*    (2006.01)

(52) U.S. Cl.
CPC ........ *F16C 33/502* (2013.01); *F16C 33/4605* (2013.01); *F16C 33/543* (2013.01); *F16C 2300/14* (2013.01)

(58) Field of Classification Search
CPC ............. F16C 33/4605; F16C 33/4676; F16C 33/4682; F16C 33/50; F16C 33/502; F16C 33/506; F16C 33/51; F16C 33/513; F16C 33/541; F16C 33/542; F16C 33/543; F16C 33/547; F16C 33/2226; F16C 33/36; F16C 2300/14; B21D 53/12
See application file for complete search history.

(56) References Cited

U.S. PATENT DOCUMENTS 2,269,224 A    1/1942  Reilly
2,417,559 A *  3/1947  Larson ................. F16C 19/545
                                                        384/573
2,591,160 A    4/1952  Kilian
(Continued)

FOREIGN PATENT DOCUMENTS

CN    103415717 A    11/2013
CN    104475350 A     4/2015
(Continued)

OTHER PUBLICATIONS

DE102015206533_A1_DESCRIPTION.*
(Continued)

*Primary Examiner* — Phillip A Johnson
(74) *Attorney, Agent, or Firm* — J-TEK LAW PLLC; Scott T. Wakeman; Mark A. Ussai (57) ABSTRACT

A cage segment defines a single pocket of a multipart rolling-element bearing cage and includes first and second circumferentially spaced side walls connected by first and second end walls. The first and second side walls and the first and second end walls are formed by at least one sheet metal segment connected at at least one joint.

20 Claims, 4 Drawing Sheets

(56) References Cited

U.S. PATENT DOCUMENTS

| | | | |
|---|---|---|---|
| 2,721,776 A * | 10/1955 | Ruist | F16C 19/362 384/578 |
| 2,946,633 A * | 7/1960 | Gothberg | F16C 33/485 384/909 |
| 3,202,467 A | 8/1965 | Karl-Albert | |
| 3,313,582 A | 4/1967 | Henry | |
| 3,353,246 A | 11/1967 | Farmer | |
| 3,356,428 A | 12/1967 | Ralph | |
| 3,473,857 A | 10/1969 | Pitner | |
| 3,605,247 A | 9/1971 | Bingle et al. | |
| 3,820,867 A | 6/1974 | Dickinson et al. | |
| 3,902,772 A | 9/1975 | Spate | |
| 4,397,507 A | 8/1983 | Kraus et al. | |
| 4,577,088 A | 3/1986 | Sharp | |
| 4,821,386 A | 4/1989 | Simon et al. | |
| 5,187,345 A | 2/1993 | Alling et al. | |
| 5,255,985 A | 10/1993 | Alling | |
| 5,528,706 A | 6/1996 | Harimoto et al. | |
| 6,330,748 B1 | 12/2001 | Müntnich et al. | |
| 6,752,535 B2 | 6/2004 | Krochak | |
| 6,883,968 B2 | 4/2005 | Fugel et al. | |
| 7,571,706 B2 | 8/2009 | Ichikawa et al. | |
| 8,696,210 B2 | 4/2014 | Kawai et al. | |
| 8,770,854 B2 | 7/2014 | Friedrich et al. | |
| 8,794,845 B2 * | 8/2014 | Beck | B21D 53/12 384/573 |
| 9,239,077 B2 | 1/2016 | Doki-Thonon et al. | |
| 9,382,947 B2 | 7/2016 | Ishibashi | |
| 9,429,194 B2 | 8/2016 | Reimchen | |
| 9,512,881 B2 | 12/2016 | Katayama et al. | |
| 9,551,377 B2 | 1/2017 | Haas et al. | |
| 11,149,793 B2 | 10/2021 | Friedrich et al. | |
| 2007/0248298 A1 | 10/2007 | Chihara | |
| 2008/0245631 A1 | 10/2008 | Bochen et al. | |
| 2012/0063713 A1 * | 3/2012 | Beuerlein | F16C 33/502 384/578 |
| 2012/0170883 A1 | 7/2012 | Evans et al. | |
| 2013/0034321 A1 | 2/2013 | Beck et al. | |
| 2013/0308890 A1 | 11/2013 | Steblau | |
| 2015/0159696 A1 | 6/2015 | Manne et al. | |
| 2016/0017919 A1 | 1/2016 | Haas et al. | |
| 2019/0226528 A1 | 7/2019 | Hainz et al. | |
| 2021/0372475 A1 | 12/2021 | Friedrich et al. | |
| 2022/0403883 A1 | 12/2022 | Beyfuss et al. | |
| 2022/0403885 A1 | 12/2022 | Beyfuss et al. | |
| 2022/0403886 A1 | 12/2022 | Beyfuss et al. | |
| 2023/0220877 A1 | 7/2023 | Beyfuss et al. | |
| 2023/0220879 A1 | 7/2023 | Beyfuss et al. | |

FOREIGN PATENT DOCUMENTS

| | | | |
|---|---|---|---|
| CN | 104847794 A | 8/2015 | |
| CN | 104847795 A | 8/2015 | |
| CN | 105605100 A | 5/2016 | |
| CN | 106271725 A | 1/2017 | |
| CN | 206215979 U | 6/2017 | |
| CN | 107120357 A | 9/2017 | |
| DE | 2111081 A1 | 9/1972 | |
| DE | 3130610 A1 | 2/1983 | |
| DE | 19910928 A1 | 9/2000 | |
| DE | 10065169 A1 | 7/2002 | |
| DE | 102006045436 A1 | 3/2008 | |
| DE | 102008034922 A1 | 2/2010 | |
| DE | 102009017751 A1 | 10/2010 | |
| DE | 102009034018 A1 | 12/2010 | |
| DE | 102009004657 B4 | 2/2011 | |
| DE | 102012221097 A1 | 5/2014 | |
| DE | 102013218286 A1 | 3/2015 | |
| DE | 102015210924 A1 | 7/2016 | |
| DE | 102015206533 A1 | 10/2016 | |
| DE | 102015206533 A1 * | 10/2016 | |
| DE | 102016201052 A1 | 7/2017 | |
| DE | 102016216286 A1 | 3/2018 | |
| DE | 102016222336 A1 | 5/2018 | |
| DE | 102017117010 A1 | 7/2018 | |
| DE | 102017127529 A1 | 5/2019 | |
| DE | 102019115335 A1 | 12/2020 | |
| EP | 0074803 A1 | 3/1983 | |
| EP | 2213894 A1 | 8/2010 | |
| EP | 2677184 A1 * | 12/2013 | F16C 33/4611 |
| EP | 2677184 A1 | 12/2013 | |
| EP | 2839175 B1 | 5/2016 | |
| EP | 4105506 A1 | 12/2022 | |
| FR | 2234483 A1 | 1/1975 | |
| FR | 2514440 A1 | 4/1983 | |
| FR | 2612102 A1 | 9/1988 | |
| FR | 3013087 A1 | 5/2015 | |
| GB | 1431612 A | 4/1976 | |
| GB | 2103307 A | 2/1983 | |
| JP | H0742744 A | 2/1995 | |
| JP | H0742744 U | 8/1995 | |
| JP | 07317773 A | 12/1995 | |
| JP | H07317773 A | 12/1995 | |
| JP | H08270658 A | 10/1996 | |
| JP | 2005076697 A | 3/2005 | |
| JP | 2006064044 A | 3/2006 | |
| JP | 2007247856 A | 9/2007 | |
| JP | 2008215390 A | 9/2008 | |
| JP | 2008215615 A | 9/2008 | |
| JP | 2009243556 A | 10/2009 | |
| JP | 4786124 B2 | 10/2011 | |
| JP | 2013007435 A | 1/2013 | |
| JP | 2013061076 A | 4/2013 | |
| JP | 2013108587 A | 6/2013 | |
| JP | 2017026083 A | 2/2017 | |
| JP | 6197844 B2 | 9/2017 | |
| NL | 6910823 A | 3/1970 | |
| WO | 2008040290 A1 | 4/2008 | |
| WO | 2014136816 A1 | 9/2014 | |
| WO | 2015022355 A1 | 2/2015 | |
| WO | 2018109784 A1 | 6/2018 | |

OTHER PUBLICATIONS

LaserJob, Inc., Laser Material Processing, Oct. 2012, p. 2 (Year: 2012).

Unpublished U.S. Appl. No. 17/835,089.

European Search Report from the European Patent Office dated Oct. 21, 2022 in corresponding EP application No. 22178211.3, including European Search Opinion, and translation thereof.

European Search Report from the European Patent Office dated Oct. 28, 2022 in corresponding EP application No. 22 178 210.5, including European Search Opinion, and translation thereof.

European Search Report from the European Patent Office dated Feb. 11, 2022, in related application No. EP 22178213.9, including European Search Opinion.

Extended European Search Report from the European Patent Office dated May 12, 2023, in related application No. EP 23150846.6, including European Search Opinion.

Extended European Search Report from the European Patent Office dated May 12, 2023, in related application ho. EP 23150847.4, including European Search Opinion.

Office Action from the United States Patent Office dated Jun. 1, 2023 in related U.S. Appl. No. 17/835,089.

Office Action from the United States Patent Office dated Mar. 2, 2023 in related U.S. Appl. No. 17/400,177.

Office Action from the United States Patent Office dated Mar. 30, 2023 in related U.S. Appl. No. 17/350,081.

* cited by examiner

CAGE SEGMENT FOR A ROLLING-ELEMENT BEARING CAGE

CROSS-REFERENCE

This application claims priority to German patent application no. 10 2021 206 282.2 filed on Jun. 18, 2021, the contents of which are fully incorporated herein by reference.

TECHNOLOGICAL FIELD

The present disclosure is directed to a sheet metal cage segment for a rolling-element bearing cage, a rolling-element bearing cage including a plurality of sheet metal cage segments a rolling-element bearing including the rolling-element bearing cage.

BACKGROUND

Rolling elements in rolling-element bearings can be guided and retained, for example, by rolling-element bearing cages. This can be of use not only in the operation of the rolling-element bearing, but also during the assembly of the rolling-element bearing. It is known that rolling-element bearing cages can be manufactured on the one hand from metal by various manufacturing methods, and on the other hand from a plastic, for example, by an injection-molding method. Due to the temperature behavior and the required strength of the material, it can be necessary to use in particular a fiberglass-reinforced plastic, such as, for example, fiberglass-reinforced polyether ether ketone (PEEK). However, especially in large bearings, these rolling-element bearing cages can already be very expensive due to the quantities of material required, in particular with plastics having a high price per kilogram. Larger metal cages are usually manufactured by bulk material first being rolled and then further processed by machining. "Known methods" here are understood to mean that they require on the one hand a high material usage, and on the other hand a combination of several, sometimes complex, manufacturing methods using different machine tools with the result that the manufacturing can be complex and/or cost-intensive.

SUMMARY

It is therefore an aspect of the present disclosure to provide a cage segment for a rolling-element bearing cage, which cage segment can be manufactured in a simple and cost-effective manner.

In the following a cage segment is disclosed for a multipart rolling-element bearing cage, in particular for large rolling-element bearings. The cage segment can in particular be a cage segment for a roller bearing, i.e., a rolling-element bearing including roller-shaped rolling elements, such as, for example, tapered rollers, cylindrical rollers, barrels, needles, and the like. In order to reduce the amount of material used and the manufacturing expense, the cage segment is present as a preform or a kit in a preliminary stage of production which is comprised of one or more flat sheet metal components configured to be connected in order to form the cage segment. Here in its assembled form the cage segment includes at least one joint at which two ends of the sheet metal component(s) is/are connected in order to form a pocket that is suitable to receive at least one rolling element. That is, with a sheet metal component, the sheet metal component is joined at its ends. Due to the use of sheet metal, in comparison to a conventional cage segment, in particular made of plastic, the cage segment can be made thinner. In addition to a weight and material savings, this has the further advantage that it allows a smaller spacing between the rolling elements so that even with large rolling-element bearings more rolling elements can be housed in the rolling-element bearing, whereby an efficiency of the rolling-element bearing can be increased. A large rolling-element bearing can in particular be a rolling-element bearing having a diameter of more than one meter.

The sheet metal can in particular be a metal sheet, a sheet metal panel, a sheet metal ribbon, in particular a coiled sheet metal ribbon (a so-called coil) or the like. Sheet metal can be processed and shaped easily and cost-effectively, for example, by cutting, laser cutter, embossing, deep-drawing, and bending. Furthermore, a machining process method can be omitted so that a degree of material utilization can be increased.

The one or more sheet metal components of the cage segment are preferably cut from a metal sheet, in particular laser-cut, punched, and/or nibbled. In other words, the separating lines required for the cage segment are provided in the sheet metal by cutting, punching, nibbling, or the like. This means that the contour of the cage segment is first cut or punched into the sheet metal, and the shape of the cage segment is subsequently released from the sheet metal. Here a laser, a punching tool, a nibbling machine, or the like can be used.

According to a further preferred embodiment, at least one of the sheet metal components of the preliminary stage of the cage segment is provided with at least one functional element that is reshaped. The functional element is preferably embossed, deep-drawn, and/or bent. Furthermore, the at least one functional element can be shaped on the cage segment in the preliminary stage of the manufacturing. By shaping in the preliminary stage of the manufacturing, that is, before the cage segment is assembled, the provision of the functional element can be simplified. The positioning of the functional element in the flat preliminary stage of the cage segment can also be effected more precisely and more quickly.

According to a further embodiment, with respect to an installed state in a rolling-element bearing, the cage segment has a length that is defined by the axial length of the rolling element receivable in the cage segment, a width that is defined by the diameter of the receivable rolling-element, and a height, where the height of the cage segment is essentially identical over the entire cage segment. The "height" is understood to mean particular an extension of the cage segment, when it is used in a rolling-element bearing, in a radial direction of the rolling-element bearing. Due to the essentially identical height of the cage segment over the entire cage segment, the material of the cage segment can form a frame, in particular around the functional elements, whereby the stability of the functional element and/or of the cage segment is increased.

The at least one functional element is preferably a retaining element that is configured to interact with a rolling element in order to hold the rolling element. In the assembled form of the cage segment the retaining element faces toward and/or away from the pocket. In particular, a retaining element can be configured to hold a rolling element in a pocket of the cage segment, in particular at a desired position. Alternatively or additionally, the retaining element can be configured as a tab so that a rolling element can be snapped into the cage segment, and the rolling element does not release from the cage segment, for example, even during an overhead installation. For example, the retaining element can be configured to prevent the cage segment from migrating radially outward and/or to ensure that the cage segment remains around the rolling element.

Furthermore, the at least one functional element can be a guide element that is configured to interact with a flange in order to guide the cage segment, wherein in the assembled form of the cage segment, the guide element faces the flange. By a guiding against a flange of the rolling-element bearing, a guiding of the rolling-element bearing cage against a raceway of the rolling-element bearing can advantageously be omitted, whereby the service life of the raceways can be increased.

Furthermore, the at least one functional element can be a connecting element that is configured to interact with a coupling element in order to connect the cage segment to a further cage segment. The cage segments can additionally be held together by the coupling element, whereby the cage composite gains stability, and/or an installation of the cage can be simplified. The cage segments can be guided by the coupling element, which can be, for example, a cable, a wire, or a ring, and have a defined preload.

Connecting element can preferably include at least one eyelet through which the coupling element is threadable. In one design of the connecting elements as eyelets, the coupling element can be guided through these eyelets in a simple manner and removed again if required. Here the coupling element is not fixed to the eyelets but rather can move in the eyelets. A clearance between the cage segments, and thus the rolling elements, and a movement of the cage segments with respect to one another is thereby not restricted. Alternatively, the eyelets can also be configured as open hooks or loops into which the coupling element is mountable or clippable or snappable.

According to a further preferred embodiment, the cage element includes a first alignment element at the joint at the first end and a second alignment element at the second end, wherein the second alignment element is complementary to the first alignment element, and wherein the first and the second alignment element interact in order to fix the first end and the second end in at least a first direction. For example, the alignment elements can be configured to align the first and the second end such that the cage segment has an edge-free or step-free surface lying opposite a raceway of a rolling-element ring. Furthermore, the alignment elements can also be configured to provide an adjustment possibility in a second direction perpendicular to the first direction, so that the joint is suitable to compensate for manufacturing tolerances. Furthermore, the first and the second alignment elements can be configured to engage into each other. For example, the first alignment element can include a first toothing, and the second alignment element can include a second toothing complementary to the first toothing.

According to another embodiment, a single-pocket cage segment of a multipart rolling-element bearing cage includes first and second side walls connected by first and second end walls. The first and second side walls and the first and second end walls are formed by at least one sheet metal segment having at least two ends connected at at least one joint. At least one of the first and second side walls and/or at least one of the first and second end walls may include at least one functional element comprising a reshaped portion of the at least one sheet metal segment, and the functional element may be an embossment, a deep drawn structure or a flap bent out of a plane of the sheet metal segment.

According to a further aspect, a rolling-element bearing cage is proposed, in particular for large rolling-element bearings, including a plurality of cage segments as described above. Here a plurality of cage segments can be connectable at least temporarily via a coupling element. Here, for example, every second rolling element can be guided in a cage segment. Alternatively a cage segment can also be provided for each rolling element. For example, the outer diameter of the rolling-element bearing cage can be more than 1200 mm.

According to still a further aspect, a rolling-element bearing, in particular a large rolling-element bearing, is proposed including at least one inner ring and at least one outer ring and rolling elements disposed between the inner ring and the outer ring, wherein the rolling elements are held by an above-described rolling-element bearing cage.

Further advantages and advantageous embodiments are specified in the description, the drawings, and the claims. Here in particular the combinations of features specified in the description and in the drawings are purely exemplary, so that the features can also be present individually or combined in other ways.

In the following the invention is described in more detail using the exemplary embodiments depicted in the drawings. Here the exemplary embodiments and the combinations shown in the exemplary embodiments are purely exemplary and are not intended to define the scope of the invention. This scope is defined solely by the pending claims.

BRIEF DESCRIPTION OF THE DRAWINGS

FIG. 2 is a first perspective view of a sheet metal component of the cage segment of

FIG. 1.

DETAILED DESCRIPTION

In the following, identical or functionally equivalent elements are designated by the same reference numbers.

Figure 1:
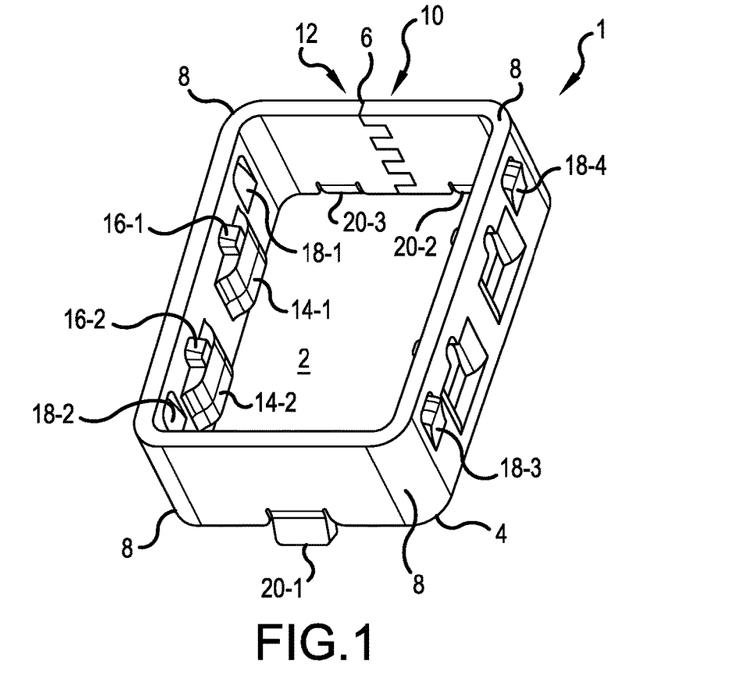
FIG. 1 is a perspective view of a cage segment according to a first embodiment of the present disclosure.
Figure 2:
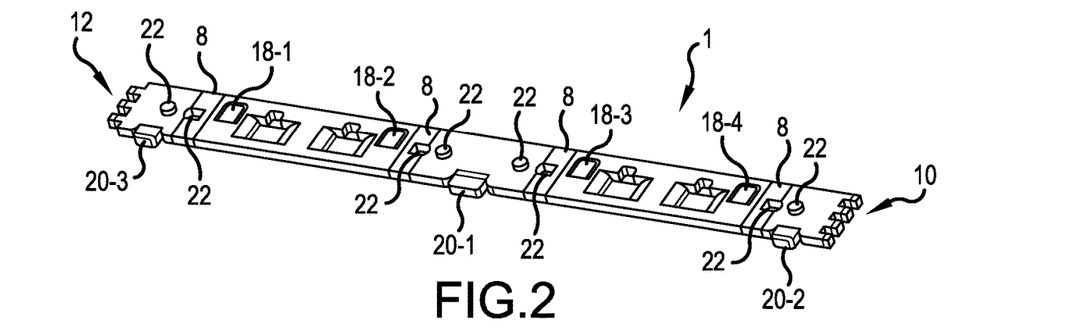
Figure 3:
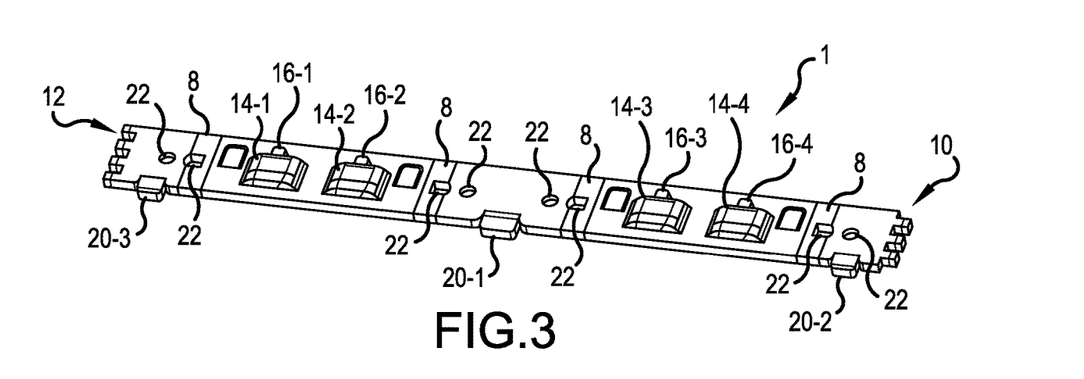
FIG. 3 is a second perspective view of a sheet metal component of the cage segment of FIG. 1.

With respect to FIGS. 1 to 3, a cage segment 1 is shown according to a first embodiment. FIG. 1 shows a perspective view of the cage segment 1, FIG. 2 shows a perspective view of the surface of the unfolded cage segment 1 of FIG. 1 facing away from the pocket 2, and FIG. 3 shows a perspective view of the surface of the unfolded cage segment 1 of FIG. 1 facing the pocket 2. The phrase "cage segment" as used herein refers both to the cage segment in its final form as shown in FIG. 1 and to the unfolded cage segment shown in FIGS. 2 and 3.

The cage segment 1 comprises a sheet metal component 4 that is joined at a joint 6 in order to form a pocket 2 that is configured to receive at least one rolling element. In a preliminary stage of the manufacturing, the cage segment 1 of FIG. 1 is comprised of a preform including a flat sheet metal component 4.

In order to assemble the cage segment 1 from the sheet metal component 4, the sheet metal component 4 is bent at prescribed corner regions 8 and joined at the two ends of the sheet metal component 4, whereby the joint 6 is formed. The assembled cage segment 1 forms the pocket 2 that is suited to receive at least one rolling element, wherein the corner regions 8 form the corners of the cage segment 1.

A first alignment element 10 and a second alignment element 12 complementary to the first alignment element 10 are provided at the ends of the sheet metal component 4. In the embodiment shown in FIGS. 1 to 3, the alignment elements 10, 12 are rectangular toothings. However, other shapes are also conceivable, such as, for example, wave-shaped, triangular, and/or polygonal. The two alignment elements 10, 12 can be, for example, punched and/or cut. Here the alignment elements 10, 12 are configured to align the cage segment 1 at the joint 6 such that the cage segment can be assembled. In particular, the alignment elements 10, 12 are configured to fix the sides that are attached to each other in a first direction that is perpendicular to the surface of the pocket 2 and to provide adjustability in at least one direction perpendicular to the first direction, which is suitable to compensate for manufacturing tolerances and the like.

Furthermore, four retaining elements 14-1, 14-2, 14-3, 14-4 facing into the pocket 2 are provided on the cage element 1, which retaining elements 14-1, 14-2, 14-3, 14-4 are configured to hold the rolling element 32 at a desired position in the pocket 2. Furthermore, four tabs 16-1, 16-2, 16-3, 16-4 inclined toward the pocket are furthermore provided above the retaining elements 14-1, 14-2, 14-3, 14-4, which tabs 16-1, 16-2, 16-3, 16-4 are configured to hold a rolling element in the pocket 2 or to prevent the cage segment 1 from migrating radially outward in use. In addition, four further tabs 18-1, 18-2, 18-3, 18-4 are provided on the side of the cage segment 1 facing away from the pocket that are configured to hold a rolling element that is guided by an outer side of the cage segment 1. Furthermore, guide elements 20-1, 20-2, 20-3 are provided on the surfaces of the cage segment 1 that will face towards a flange of a rolling-element bearing during use, which guide elements 20-1, 20-2, 20-3 are configured to guide a rolling-element bearing cage against a flange of the rolling-element bearing. Guiding the rolling-element bearing cage against a raceway of the rolling-element bearing can thereby advantageously be avoided which can increase the service life of the raceways. In addition, connecting elements 22 are provided on the cage segment to which coupling elements can be attached in order to connect the individual cage segments 1 to form a rolling-element bearing cage. The shape of the connecting elements 22 is essentially dependent on the coupling element chosen.

Functional elements, such as the retaining elements 14, the tabs 16, 18, the guide elements 20, and the connecting elements 22, are preferably formed on the cage segment 1 by a reshaping process, such as, for example, by embossing, deep-drawing, and/or bending, Furthermore, it is advantageous to form the at least one functional element on the sheet metal component 4. That is, the sheet metal component 4 is released from a sheet metal panel, and before the sheet metal component 4 is assembled into the cage segment 1, the functional elements are formed in while the sheet metal component is still flat. This simplifies on the one hand the shaping of the functional elements, and on the other hand a positioning of the functional elements in the flat form of the sheet metal component 4 can be effected more precisely and more quickly.

Figure 4:
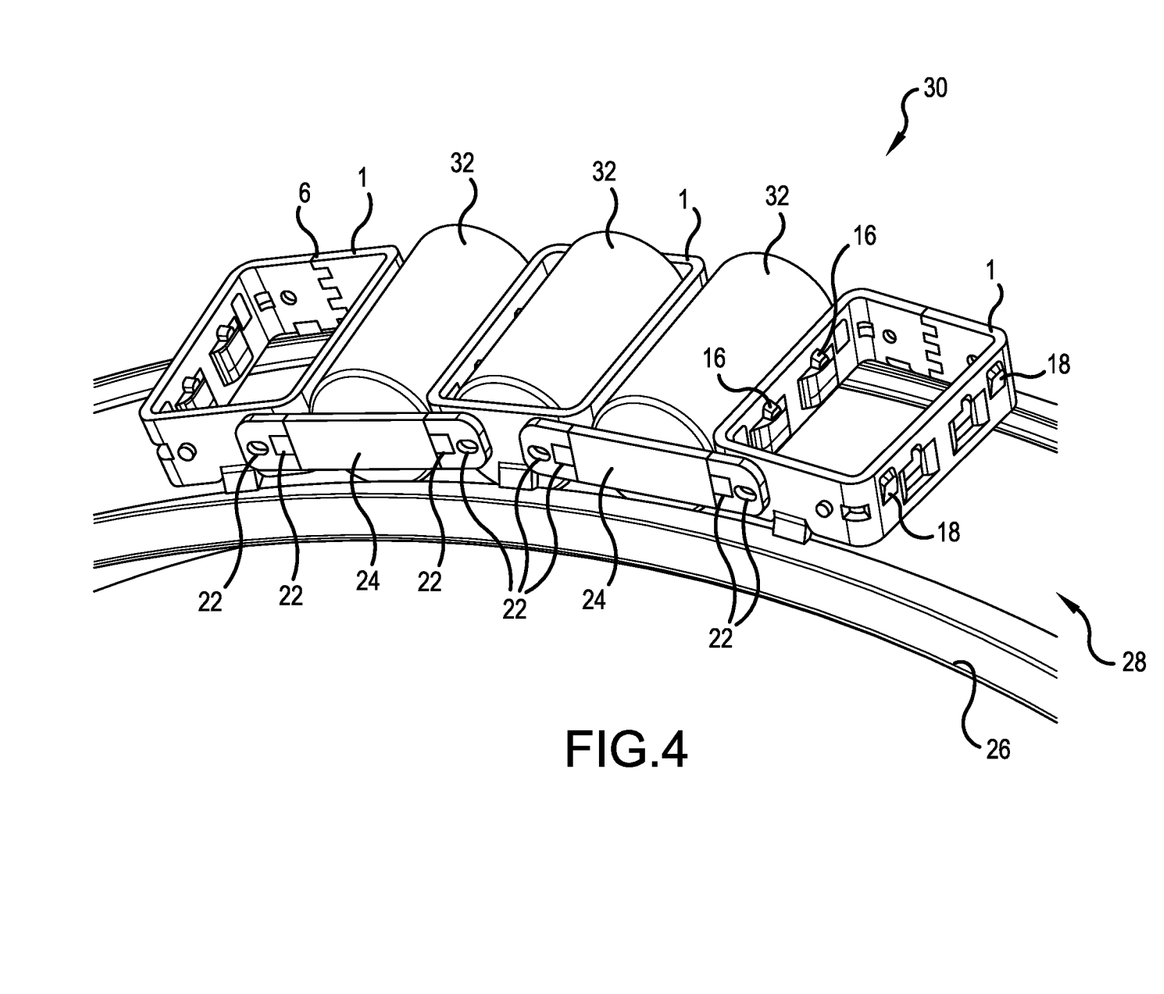
FIG. 4 is a perspective view of a rolling-element bearing cage formed from the cages segments of FIG. 1.

FIG. 4 shows a perspective view of a section of a rolling-element bearing cage 30 in which the cage segment 1 of FIG. 1 is used. The rolling-element bearing cage 30 can preferably be used in large rolling-element bearings having a diameter of more than one meter. The rolling-element bearing cage 30 has a plurality of cage segments 1, as described above, and a plurality of coupling elements 24, wherein the coupling elements 24 in FIG. 4 have a flat longitudinal shape. In FIG. 4, the coupling elements 24 are attached to the cage segment using the connecting elements 22. Here the connecting elements 22 can be configured as threaded holes and/or pins and/or openings in which a correspondingly complementary coupling means, such as, for example, a screw, a pin, or an opening, is disposed on the coupling element.

As is shown, for example, in FIG. 1, further tabs 16, 18 are disposed both on a surface of the cage segment 1 facing the pocket 2 and on a surface of the cage segment 1 facing away from the pocket 2 that are configured to hold rolling elements 32. Consequently in the rolling-element bearing cage 30, every second rolling element 32 is guided in a pocket 2 of the cage segment 1, while the other half of the rolling elements 32 are respectively guided between two cage segments 1. Alternatively a cage segment 1 can also be provided for each rolling element 32. The rolling elements 32 roll on an inner raceway 28 of an inner ring 26 and on the outer raceway of an outer ring (not shown) of a rolling-element bearing, in order to permit a relative rotation of the inner ring and of the outer ring.

Figure 5:
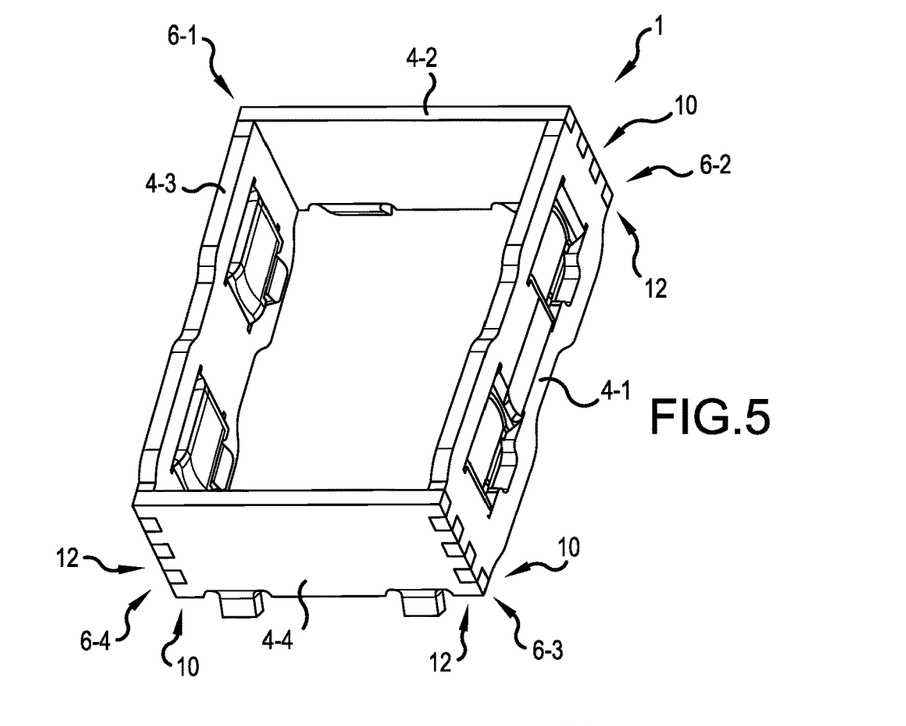
FIG. 5 is a perspective view of a cage segment according to a second embodiment of the present disclosure.

FIG. 5 shows a cage segment 1 according to a second embodiment. In contrast to the cage segment 1 of FIG. 1, the cage segment 1 of FIG. 5 comprises four sheet metal components 4-1, 4-2, 4-3, 4-4, which are each joined at the corners of the cage segment 1. For this purpose the respective sheet metal components 4-1 to 4-4 are respectively provided with a first alignment element 10 and a second alignment element 12 with the aid of which the sheet metal components 4-1 to 4-4 are assembled.

Figure 6:
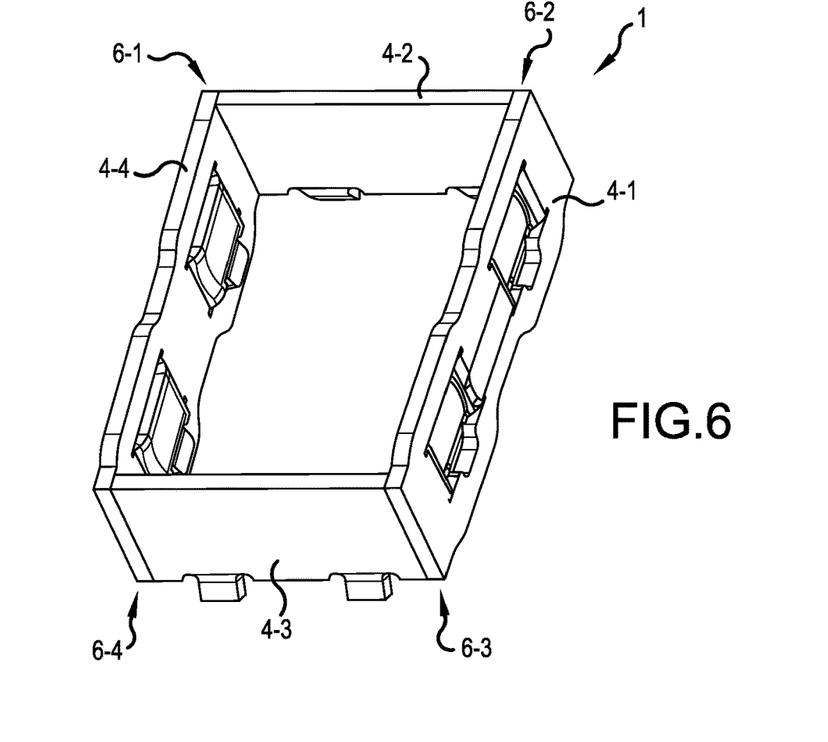
FIG. 6 is a perspective view of a cage segment according to a third embodiment of the present disclosure.

FIG. 6 shows a cage segment 1 according to a third embodiment. Like the cage segment of FIG. 5, the cage segment of FIG. 6 comprises four sheet metal components 4-1, 4-2, 4-3, 4-4, which are each joined at the corners of the cage segment 1. For this purpose the respective sheet metal components 4-1 to 4-4 are respectively welded to each other directly, via a butt or fillet weld, without alignment elements 10, 12.

Figure 7:
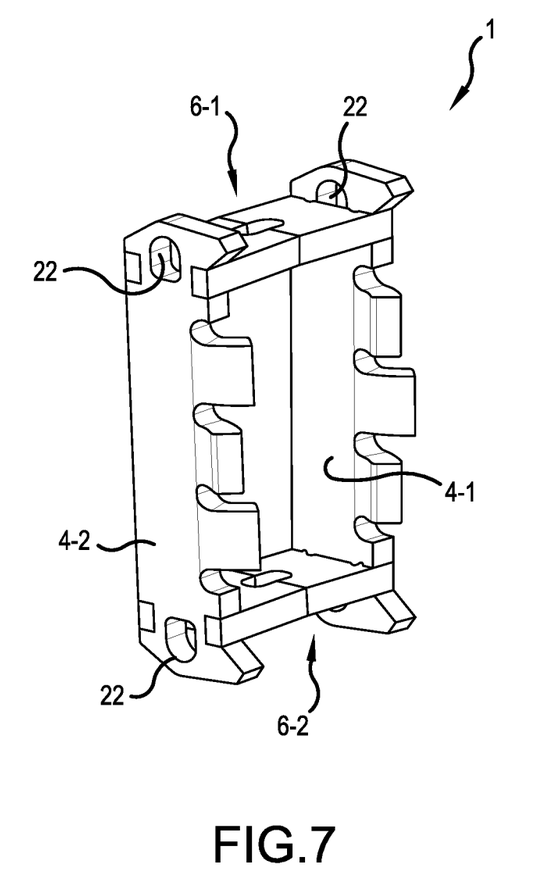
FIG. 7 is a perspective view of a cage segment according to a fourth embodiment of the present disclosure.

FIG. 7 shows a cage segment 1 according to a fourth embodiment. In contrast to the cage segment of FIG. 1, the cage segment of FIG. 7 comprises two sheet metal components 4-1, 4-2, which are joined at two joints 6-1, 6-2. Furthermore, eyelets are provided as connecting elements 22 on the cage segment 1 of FIG. 7, which eyelets can interact, for example, with a coupling element that is threadable through them, such as, for example, a cable or wire. In one design of the connecting elements 22 as eyelets, the coupling element can be guided through these eyelets in a simple manner and removed again if required. Here the coupling element is not fixed to the eyelets, but rather can move in the eyelets. A clearance between the cage segments 1, and thus the rolling elements 32, and a movement of the cage segments with respect to one another is thereby not restricted. Alternatively, the eyelets can also be configured as open hooks or loops into which the coupling element is mountable or clippable or snappable.

In order to reduce the material usage and the manufacturing expense, a cage segment 1 is manufactured from a metal sheet, so that a material- and effort-intensive machining method can be omitted. Here in a preliminary stage of the manufacturing, the cage segment 1 is present as a preform or a kit that is comprised of one or more flat sheet metal components 4, which are provided with functional elements that are configured for holding and guiding rolling elements, for guiding the cage segments, and/or for connecting the cage segments to one another. Here the functional elements can already be provided in the sheet metal components before the sheet metal components 4 are joined at their ends into the finished cage segment 1. The cage segment 1 can thereby be manufactured with a small material use and/or a high degree of material utilization, as well as with a relatively low work expense and thus cost-effectively, in particular even with small quantities.

Representative, non-limiting examples of the present invention were described above in detail with reference to the attached drawings. This detailed description is merely intended to teach a person of skill in the art further details for practicing preferred aspects of the present teachings and is not intended to limit the scope of the invention. Furthermore, each of the additional features and teachings disclosed above may be utilized separately or in conjunction with other features and teachings to provide improved cage segments for rolling-element bearing cages.

Moreover, combinations of features and steps disclosed in the above detailed description may not be necessary to practice the invention in the broadest sense, and are instead taught merely to particularly describe representative examples of the invention. Furthermore, various features of the above-described representative examples, as well as the various independent and dependent claims below, may be combined in ways that are not specifically and explicitly enumerated in order to provide additional useful embodiments of the present teachings.

All features disclosed in the description and/or the claims are intended to be disclosed separately and independently from each other for the purpose of original written disclosure, as well as for the purpose of restricting the claimed subject matter, independent of the compositions of the features in the embodiments and/or the claims. In addition, all value ranges or indications of groups of entities are intended to disclose every possible intermediate value or intermediate entity for the purpose of original written disclosure, as well as for the purpose of restricting the claimed subject matter.

REFERENCE NUMBER LIST

1 Cage segment
2 Pocket
4 Sheet metal component
6 Joint
8 Corner
10 First alignment element
12 Second alignment element
14 Retaining element
16 Tab
18 Tab
20 Guide element
22 Connecting element
24 Coupling element
26 Inner ring
28 Inner raceway
30 Rolling-element bearing cage
32 Rolling element

What is claimed is:

1. A single-pocket cage segment of a multipart rolling-element bearing cage, the cage segment comprising:
   a first side wall and a second side wall connected by a first end wall and a second end wall,
   wherein the first and second side walls and the first and second end walls are formed by at least one sheet metal segment having at least two ends connected at at least one joint, and
   wherein the first side wall includes at least one functional element formed by pressing a first side of the first side wall to form a projection on an opposite side of the first side wall and/or the first end wall includes at least one functional element formed by pressing a first side of the first end wall to form a projection on an opposite side of the first end wall.

2. The cage segment according to claim 1,
   wherein, with respect to an installed state in a rolling-element bearing, the cage segment has a length based on an axial length of a rolling element to be received in the cage segment, a width based on a diameter of the rolling element, and a height, and
   wherein the height is substantially constant over the entire cage segment.

3. The cage segment according to claim 1,
   wherein the at least one functional element is an embossment, a deep-drawn structure, or a flap.

4. The cage segment according to claim 3,
   wherein the at least one functional element extends into the pocket.

5. The cage segment according to claim 3,
   wherein the at least one functional element is a retaining element configured to interact with a rolling element in order to hold or guide the rolling element.

6. The cage segment according to claim 3,
   wherein the at least one functional element is a guide element configured to interact with a flange in order to guide the cage segment.

7. The cage segment according to claim 3,
   wherein the at least one functional element is a connecting element configured to interact with a coupling element to connect the cage segment to a further cage segment.

8. The cage segment according to claim 1,
   wherein the at least one joint includes a first alignment structure and a second alignment structure complementary to the first alignment structure.

9. A rolling-element bearing cage comprising a plurality of the cage segments of claim 1.

10. The rolling-element bearing cage according to claim 9,
    wherein each of the cage segments includes a connecting element, and
    wherein a coupling element interconnects the cage segments via the connecting elements.

11. A rolling-element bearing including the rolling-element bearing cage according to claim 9.

12. The cage segment according to claim 1,
    wherein each of the at least one sheet metal segment includes an embossment, a deep-drawn structure, or a flap bent out of a plane of the at least one sheet metal segment, and
    wherein the at least one sheet metal segment comprises a first sheet metal segment having a first end and a second end and a second sheet metal segment having a first end and a second end, and
    wherein the at least one joint includes a first joint between the first end of the first sheet metal segment and the first end of the second sheet metal segment.

13. The cage segment according to claim 1,
wherein the at least one functional element is spaced from a periphery of the first side wall and/or the at least one functional element is spaced from a periphery of the first end wall.

14. A single-pocket cage segment of a multipart rolling-element bearing cage, the cage segment comprising:
first and second side walls connected by first and second end walls,
wherein the first and second side walls and the first and second end walls are formed by at least one sheet metal segment having at least two ends connected at at least one joint,
wherein the at least one sheet metal segment includes an embossment, a deep-drawn structure, or a flap bent out of a plane of the at least one sheet metal segment, and
wherein the at least one sheet metal segment is a single sheet metal segment having a first end and a second end and the at least one joint is located between the first end and the second end.

15. A method comprising:
providing a plurality of single-pocket cage segments of a multipart rolling-element bearing cage, each of the cage segments comprising first and second side walls connected by first and second end walls, wherein the first and second side walls and the first and second end walls are formed by at least one sheet metal segment having at least two ends connected at at least one joint,
installing one of a first set of rolling elements into each of the plurality of cage segments, and
arranging the plurality of cage segments and inserted rolling elements on a bearing ring with one of a second set of rolling elements between each adjacent pair of the plurality of cage segments.

16. The method according to claim 15,
wherein each of the plurality of cage segments includes a projection or an embossment or a flap bent out of a plane of the at least one sheet metal segment, and
wherein the projections or the embossments or the flaps are formed before connecting the at least two ends at the at least one joint.

17. The method according to claim 16,
wherein the at least one sheet metal segment comprises a single sheet metal segment, and
wherein the first end of the at least one sheet metal segment is a first end of the single sheet metal segment and the second end of the at least one sheet metal segment is a second end of the single sheet metal segment.

18. The method according to claim 16,
wherein the at least one sheet metal segment comprises a first sheet metal segment and a second sheet metal segment,
wherein the first end of the at least one sheet metal segment is a first end of the first sheet metal segment and the second end of the at least one sheet metal segment is a first end of the second sheet metal segment.

19. The method according to claim 15,
including forming the at least one sheet metal segment by laser cutting, punching or nibbling.

20. The method according to claim 15,
including embossing the first side wall and/or the first end wall to form an embossment, and/or
deep drawing a portion of the first side wall and/or the first end wall to form a deep-drawn boss, and/or
bending a flap out of a plane of the first side wall and/or the first end wall.

* * * * *